(12) United States Patent
Bavishi et al.

(10) Patent No.: US 11,409,436 B2
(45) Date of Patent: Aug. 9, 2022

(54) BUFFER MANAGEMENT IN MEMORY SYSTEMS FOR READ AND WRITE REQUESTS

(71) Applicant: Micron Technology, Inc., Boise, ID (US)

(72) Inventors: Dhawal Bavishi, San Jose, CA (US); Trevor Conrad Meyerowitz, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 14 days.

(21) Appl. No.: 16/058,102

(22) Filed: Aug. 8, 2018

(65) Prior Publication Data
US 2020/0050366 A1    Feb. 13, 2020

(51) Int. Cl.
*G06F 3/06* (2006.01)
(52) U.S. Cl.
CPC .......... *G06F 3/0604* (2013.01); *G06F 3/0656* (2013.01); *G06F 3/0679* (2013.01)
(58) Field of Classification Search
CPC ................. G06F 5/065; G06F 5/10–14; G06F 3/06–0689; G06F 2003/0691; G06F 2212/282; G06F 12/0848; G06F 3/0604; G06F 3/0656; G06F 3/0679
See application file for complete search history.

(56) References Cited

U.S. PATENT DOCUMENTS

| 5,561,823 | A  | * | 10/1996 | Anderson | G06F 3/0601 |
|---|---|---|---|---|---|
| | | | | | 710/1 |
| 7,953,950 | B2 | | 5/2011 | Fujimoto | |
| 8,539,140 | B2 | | 9/2013 | Fujimoto | |
| 8,667,254 | B1 | * | 3/2014 | Rohrer | G06F 15/167 |
| | | | | | 710/52 |
| 10,204,041 | B2 | | 2/2019 | Allen et al. | |
| 10,782,916 | B2 | | 9/2020 | Meyerowitz et al. | |
| 2004/0205296 | A1 | * | 10/2004 | Bearden | G06F 12/0866 |
| | | | | | 711/129 |
| 2007/0183198 | A1 | | 8/2007 | Otsuka et al. | |
| 2008/0120443 | A1 | | 5/2008 | Rajan et al. | |
| 2009/0172286 | A1 | | 7/2009 | Lasser et al. | |

(Continued)

FOREIGN PATENT DOCUMENTS

JP    2017016285    1/2017

OTHER PUBLICATIONS

International Search Report and Written Opinion, PCT/US2019/043300, dated Nov. 11, 2019.

(Continued)

*Primary Examiner* — Nicholas J Simonetti
(74) *Attorney, Agent, or Firm* — Greenberg Traurig

(57) ABSTRACT

A memory system having memory components and a processing device to: receive a write request from a host system; store data of the write request in a portion of a buffer of the memory system during a first time period in which the write request is pending in the memory system; receive a read request from the host system; and store data of the read request in a portion of the buffer during a second time period in which the read request is pending in the memory system. The portion of the buffer storing the data of the write request overlaps at least in part with the portion of the buffer storing the data of the read request.

11 Claims, 13 Drawing Sheets

(56) References Cited

U.S. PATENT DOCUMENTS

| | | |
|---|---|---|
| 2009/0175084 A1 | 7/2009 | Norman |
| 2012/0265945 A1 | 10/2012 | Miyasaka |
| 2013/0013853 A1 | 1/2013 | Yeh |
| 2014/0195701 A1 | 7/2014 | Chen et al. |
| 2014/0344488 A1* | 11/2014 | Flynn ................... G06F 13/00 710/52 |
| 2015/0288977 A1 | 10/2015 | Chan et al. |
| 2016/0211973 A1 | 7/2016 | Nale et al. |
| 2017/0123721 A1 | 5/2017 | Sela et al. |
| 2017/0171553 A1 | 6/2017 | Kim et al. |
| 2017/0322726 A1 | 11/2017 | Walker et al. |
| 2018/0060232 A1 | 3/2018 | Oshinsky et al. |
| 2018/0188998 A1 | 7/2018 | Shaharabany et al. |
| 2019/0196716 A1* | 6/2019 | Xiao .................. G06F 13/1673 |
| 2019/0220224 A1 | 7/2019 | Lu et al. |
| 2019/0236030 A1* | 8/2019 | Lim ................... G06F 12/0246 |
| 2020/0050398 A1 | 2/2020 | Meyerowitz et al. |

OTHER PUBLICATIONS

International Search Report and Written Opinion, PCT/US2019/043318, dated Nov. 7, 2019.
"Proposed DDR5 NVDIMM-P Bus Protocol", Solid State Technology Association, Committee JC-45.6, Committee Item No. 2261.13D, Aug. 2011.
Extended European Search Report, EP19847247.4, dated Mar. 22, 2022.
Extended European Search Report, EP19846875.3, dated Apr. 4, 2022.

* cited by examiner

BUFFER MANAGEMENT IN MEMORY SYSTEMS FOR READ AND WRITE REQUESTS

FIELD OF THE TECHNOLOGY

At least some embodiments disclosed herein relate to memory systems in general, and more particularly, buffer management in memory systems for read and write requests.

BACKGROUND

A memory sub-system can be a storage system, such as a solid-state drive (SSD) or, a memory module, such as a non-volatile dual in-line memory module (NVDIMM), and can include one or more memory components that store data. The memory components can be, for example, non-volatile memory components and volatile memory components. In general, a host system can utilize a memory sub-system to store data at the memory components and to retrieve data from the memory components.

A standardized communication protocol allows the host system to communicate with the memory sub-system to store data and retrieve data.

For example, JEDEC (Joint Electron Device Engineering Council) Solid State Technology Association has proposed a "DDR5 NVDIMM-P Bus Protocol" for communications between a host system and an NVDIMM-P memory module. This protocol is described in detail by the JEDEC Committee Letter Ballot, Committee: JC-45.6, Committee Item Number 2261.13D, Subject: "Proposed DDR5 NVDIMM-P Bus Protocol", which is hereby incorporated by reference herein in its entirety.

BRIEF DESCRIPTION OF THE DRAWINGS

The present disclosure will be understood more fully from the detailed description given below and from the accompanying drawings of various embodiments of the disclosure.

DETAILED DESCRIPTION

At least some aspects of the present disclosure are directed to improved buffer management techniques that can reduce communication bottlenecks in buffering read and write requests that are transmitted from a host system to the memory sub-system for execution. A memory sub-system is also hereinafter referred to as a "memory device". An example of a memory sub-system is a memory module that is connected to a central processing unit (CPU) via a memory bus, such as a dual in-line memory module (DIMM), a small outline DIMM (SO-DIMM), a non-volatile dual in-line memory module (NVDIMM), etc. Another example of a memory sub-system is a storage system, such as a solid-state drive (SSD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

In some computer systems, such as a host system and a memory sub-system that are connected using an NVDIMM-P bus, the sub-system can buffer read commands and write commands from the host system for execution in a time period that is not predetermined. The memory sub-system is not required to execute the read commands and the write command in the order in which the commands are received in the memory sub-system. However, when a read buffer is full in the memory sub-system, the host system is prevented from sending further read commands to the memory sub-system, until some of the read commands in the read buffer have been completed and removed from the read buffer; and when a write buffer is full in the memory sub-system, the host system is prevented from sending further write commands to the memory sub-system, until some of the write commands in the write buffer have been completed and removed from the write buffer.

At least some aspects of the present disclosure address the above and other deficiencies by allowing at least a portion of the buffer of the memory sub-system to be used to buffer read commands and write commands as needed. When the host system needs to send more write commands, this portion shared between read and write can be used for the transmission of write commands to the memory sub-system. When the host system needs to send more read commands, this portion shared between read and write can be used for the transmission of read commands to the memory sub-system. The host system can track the available buffer capacity for read commands and write commands using the identification of available buffer capacity for read commands, the identification of available buffer capacity for write commands, and/or the identification of available total buffer capacity for read and write commands.

Figure 1:
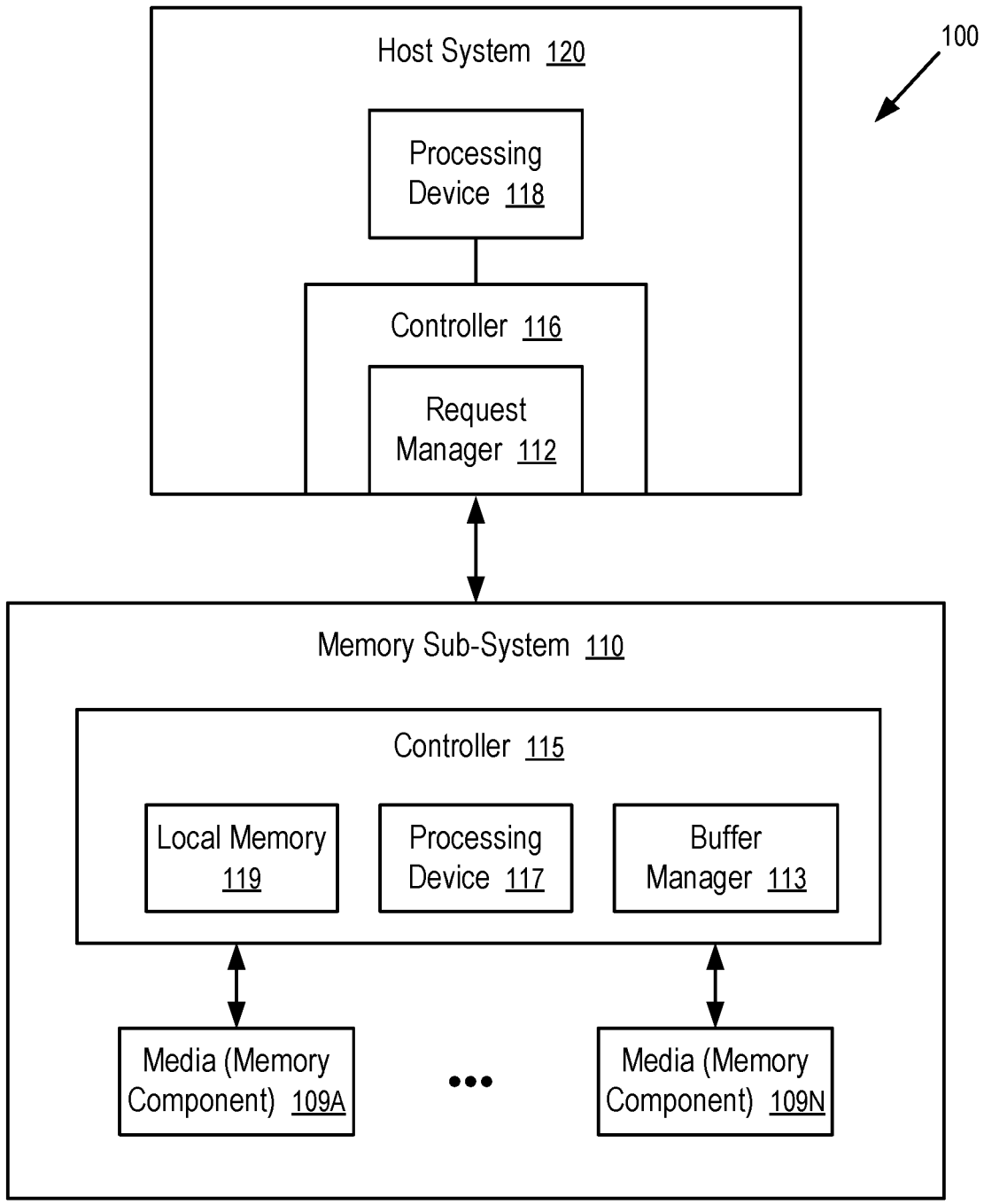
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The memory sub-system 110 includes a buffer manager 113 that can use a portion of request buffer for both read requests and write requests. In some embodiments, the controller 115 in the memory sub-system 110 includes at least a portion of the buffer manager 113. For example, the controller 115 can include logic circuitry implementing the buffer manager 113. For example, the processing device 117 (processor) of the controller 115 can be configured to execute instructions stored in local memory for performing the operations of the buffer manager 113 described herein. In some embodiments, the buffer manager 113 is part of an operating system of the host system 120, a device driver, or an application.

The host system 120 includes a request manager 112 that can track available buffer capacities in the memory sub-system 110 for transmitting read requests and write requests to the memory sub-system 110. In some embodiments, the controller 116 in the host system 120 includes at least a portion of the request manager 112. For example, the controller 116 can include logic circuitry implementing the request manager 112. For example, the processing device 118 (processor) of the host system 120 can be configured to execute instructions stored in local memory for performing the operations of the request manager 112 described herein. In some embodiments, the request manager 112 is part of an operating system of the host system 120, a device driver, or an application.

The buffer manager 113 of the memory sub-system 110 can use a shared buffer for buffering both read requests and write requests. The buffer is shared for read requests and write requests. Optionally, the buffer manager 113 can further use a read-only buffer that is only for buffering read requests but not for write requests. Similarly, the buffer manager 113 can optionally further use a write-only buffer that is only for buffering write requests but not for read requests. In some instances, the buffer manager 113 can dynamically partition a buffer into a shared buffer region, a read-only buffer region, and a write-only buffer region. After the execution of one or more buffered write requests is completed, the buffer capacity used by the executed write requests becomes available for accepting new write requests from the host system 120. The buffer manager 113 can track the reclaimed buffer capacity that becomes available for accepting new write requests. When the memory sub-system 110 communicates to the host system 120 an amount of available buffer capacity for further write requests, the amount of available buffer is allowed to write requests that the host system 120 can send without causing buffer overflow. The buffer manager 113 deducts the amount to obtain the remaining available buffer capacity tracked at the buffer manager 113.

The request manager 112 of the host system 120 can track the available read buffer capacity of the memory sub-system 110 for accepting further read requests, the available write buffer capacity of the memory sub-system 110 for accepting further write requests, and/or the total available buffer capacity of the memory sub-system 110 for accepting further read and write requests. When the host system 120 sends a write request to the memory sub-system 110, the request manager 112 reduces the available write buffer capacity and the total available buffer capacity by the amount of buffer capacity used for the write request. When the host system 120 sends a read request to the memory sub-system 110, the request manager 112 reduces the available read buffer capacity and the total available buffer capacity by the amount of buffer capacity used for the read request. When the memory sub-system 110 sends to the host system 120 data that is requested by a read request, the request manager 112 increases the available read buffer capacity and the total available buffer capacity by the amount of buffer capacity used for the read request. When the memory subsystem 110 communicates to the host system 120 an amount of available buffer capacity for further write requests, the request manager 112 increases the available write buffer capacity and the total available buffer capacity by the amount specified by the memory sub-system 110. Thus, when the available write buffer capacity is smaller than an amount of buffer space required for a write request, the request manager 112 postpones the transmission of the write request until the available write buffer capacity is larger than the amount of buffer space required for a write request. Similarly, when the available read buffer capacity is smaller than an amount of buffer space required for a read request, the request manager 112 postpones the transmission of the read request until the available read buffer capacity is larger than the amount of buffer space required for a read request.

Further details with regards to the operations of the buffer manager 113 and the request manager 112 are described below.

Figure 2:
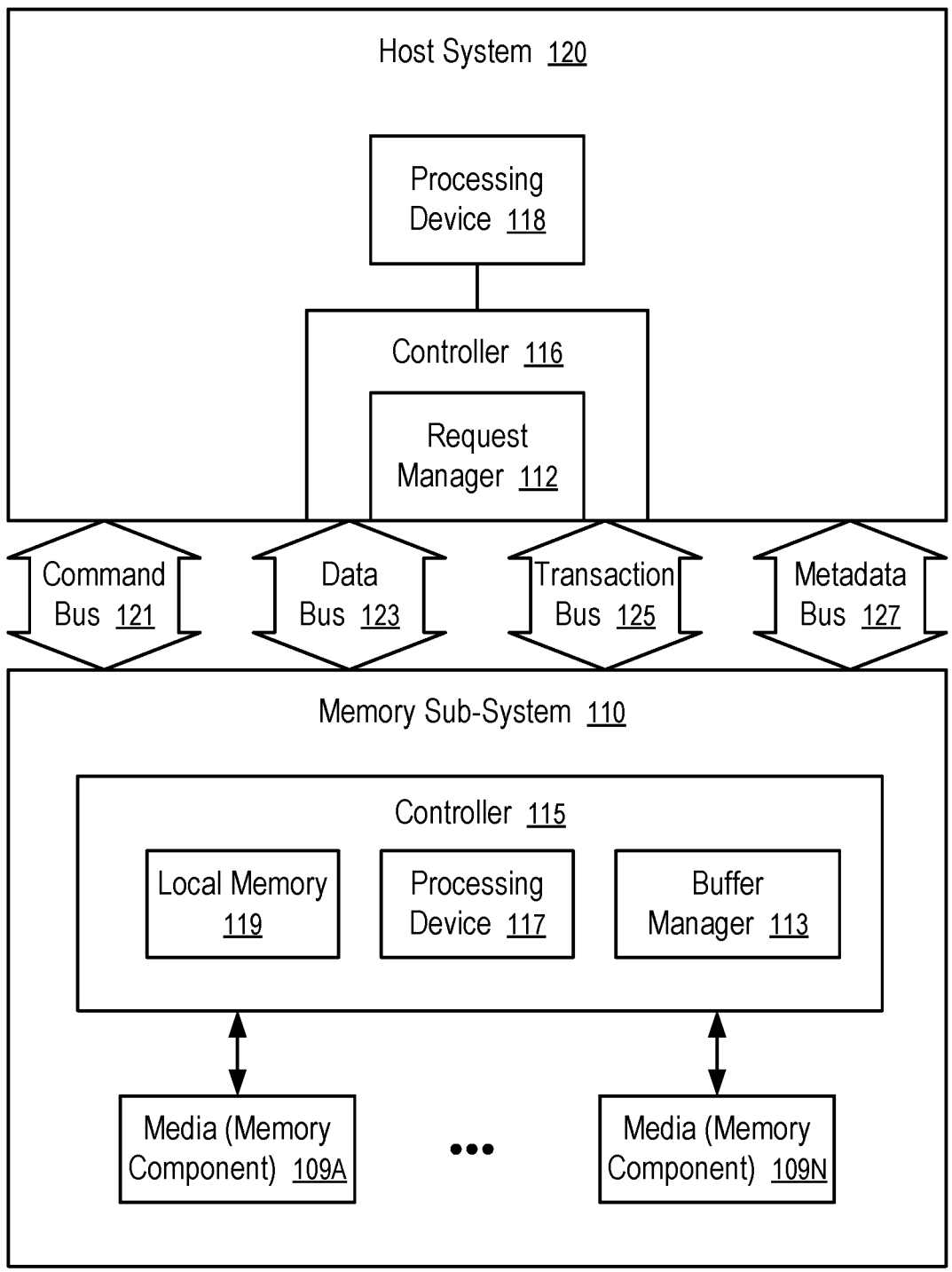
FIG. 2 illustrates an example computing system that includes a request manager and a buffer manager in accordance with some embodiments of the present disclosure.

FIG. 2 illustrates an example computing system that includes a request manager 112 and a buffer manager 113 in accordance with some embodiments of the present disclosure.

Merely for non-limiting purposes of illustration in describing FIG. 2, the controller 116 of the host system 120 is sometimes referred to below as memory controller 116, and the controller 115 of the memory sub-system 110 is sometimes referred to below as media controller 115.

In FIG. 2, the communication channel between the host system 120 and the memory sub-system 110 includes the command bus 121, a data bus 123, a transaction bus 125, and a metadata bus 127. A communication protocol for the communication channel allows asynchronous access to the memory sub-system 110 for data storage and retrieval by the host system 120. For example, the memory sub-system 110 can be an NVDIMM; and the host system 120 can access the memory controller 116 in accordance with a JEDEC NVDIMM-P Bus Protocol using the command bus 121, the data bus 123, the transaction bus 125, and the metadata bus 127.

For example, the memory controller 116 can issue a write command to store data in the memory sub-system 110. After a fixed and predetermined time window from the transmission of the write command on the command bus 121, the memory controller 116 starts transmitting the data on the data bus 123. The memory sub-system 110 is not required to complete the operations of the write command within a predetermined time period. Examples of such a write command include XWRITE and PWRITE identified in the JEDEC NVDIMM-P Bus Protocol.

For example, the memory controller 116 can issue a read command to request information from the memory sub-system 110. The memory sub-system 110 is not required to generate a response within a predetermined time window from the read command. Examples of such a read command include XREAD and SREAD identified in the JEDEC NVDIMM-P Bus Protocol. An XREAD can be given a predetermined read ID to indicate that it is an information request (status_read) that will return system state, but won't access the media directly.

In response to the read command, the memory sub-system 110 prepares data that is requested by the read command. For example, the media controller 115 can retrieve data from media (e.g., 109A, . . . , or 109N) and buffer the retrieve data in the local memory 119 or another memory such that the data can be successfully transmitted to the memory controller 116 within a predetermined time window when such a transmission is requested.

When the requested data is ready for transmission, the memory sub-system 110 can provide a response signal in the transaction bus 125. When the memory controller 116 is informed of the readiness of the memory sub-system 110 to transmit certain data, the memory controller 116 can provide a send command to request the memory sub-system 110 to start transmitting data on the data bus 123 within a predetermined time window from the send command. When responding to the send command, the memory sub-system 110 can also send transaction status information, such as read ID identifying the corresponding read command, write credit information as further discussed below, metadata corresponding to the transaction, and/or error correction code (ECC). An example of such a send command is SEND identified in the JEDEC NVDIMM-P Bus Protocol.

The memory sub-system 110 can buffer read commands and write commands received from the command bus 121 in the local memory 119 or another memory. The media controller 115 can execute the buffered commands in an order different from the order in which the commands are received.

The memory sub-system 110 has a certain amount of capacity for buffering pending read commands and write commands and their associated data. The memory controller 116 and the media controller 115 can communicate with each other to prevent buffer overflow in the memory sub-system 110.

For example, a write credit can be used to represent a unit of buffer capacity that is available for buffering a write command and its associated data of a predetermined size. In some instances, a write command can have data larger than the predetermined size; and such a write command requires multiple write credits for buffering the command and its data in the memory sub-system 110.

The memory controller 116 can maintain a count of write credits it can use to transmit write commands on the command bus 121 to the memory sub-system 110. When a write command is sent over the command bus 121, the memory controller 116 deducts the write credits used by the write command. To avoid buffer overflow, the memory controller 116 should not transmit a write command when the memory controller 11 does not have sufficient write credits for transmitting the write command to the memory sub-system 110.

The media controller 115 can maintain a count of write credits it can return to the memory controller 116 for completed write commands. After a write command buffered in the memory sub-system 110 is completed, the buffer space used by the write command can be freed to accept further write commands from the memory controller 116. The write credits used by the write command that has been completed can be added to the count of write credits that can be returned to the memory controller 116.

The memory sub-system 110 can use the metadata bus 127 to specify the number of write credits it is returning to the memory controller 116. For example, after sending a response signal on the transaction bus 125 to enable the memory controller 116 to issue a send command, the media controller 115 can transmit the number of returned write credits using the metadata bus 127. The memory sub-system 110 can transmit such a response signal in response to a read command, such as XREAD and SREAD identified in the JEDEC NVDIMM-P Bus Protocol. An example of the response signal is RSPx_n identified in the JEDEC NVDIMM-P Bus Protocol.

When the memory controller 116 uses a read command to request retrieval of data from an address, the memory controller 116 can place an address command immediately following the read command to specify the address. Similarly, when the memory controller 116 uses a write command to store data at an address, the memory controller 116 can place an address command immediately following the write command to specify the address. An example of such an address command is XADR identified in the JEDEC NVDIMM-P Bus Protocol.

The memory sub-system 110 can include a shared buffer to store pending read and write commands/requests received from the host system 120. The shared buffer can be implemented in the local memory 119 or another memory of the memory sub-system 110.

The memory sub-system 110 can include a read buffer to store pending read commands/requests received from the host system 120. The read buffer can be implemented in the local memory 119 or another memory of the memory sub-system 110. No write commands/requests and their data are stored in the read buffer.

The memory sub-system 110 can include a write buffer to store pending write commands/requests received from the host system 120. The write buffer can be implemented in the local memory 119 or another memory of the memory sub-system 110. No read commands/requests and their data are stored in the write buffer.

The buffer manager 113 can manage the use of the shared buffer, the read buffer, and/or the write buffer. The buffer manager 113 tracks reclaimed write credits representing the buffer capacity freed from the completed write requests. The buffer manager 113 can return the reclaimed write credits as write credit increments to the host system 120. The request manager 112 can track read credits representing read buffer capacity, in the read buffer and/or the shared buffer, usable by the host system 120 to send read requests to the memory sub-system 110 to retrieve data at addresses specified by the host system 120. The request manager 112 can track write credits representing write buffer capacity, in the write buffer and/or the shared buffer, usable by the host system 120 to send write requests to the memory sub-system 110 to store data at addresses specified by the host system 120. The request manager 112 can track total credits representing total buffer capacity, in the read buffer, the write buffer and/or the shared buffer, usable by the host system 120 to send read and/or write requests.

Figure 3A:
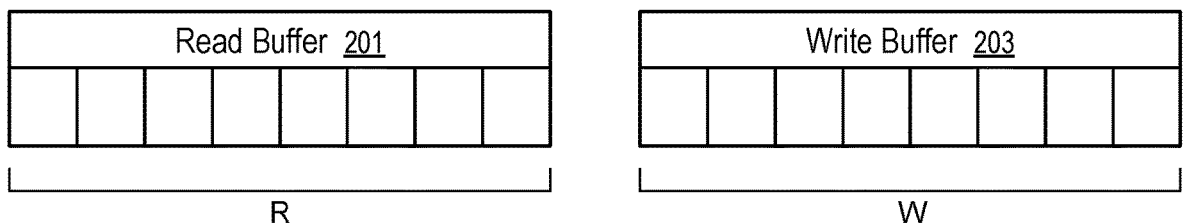
FIGS. 3A-3C illustrate example buffer configurations in accordance with some embodiments of the present disclosure.
Figure 3B:
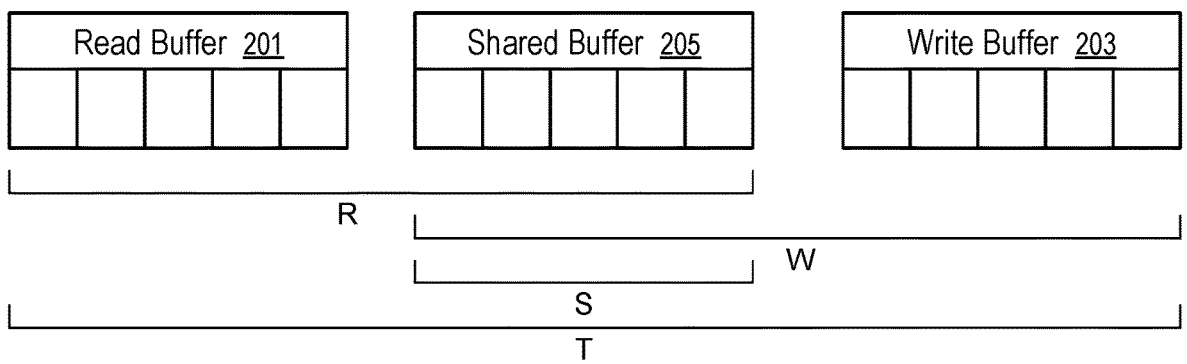
Figure 3C:
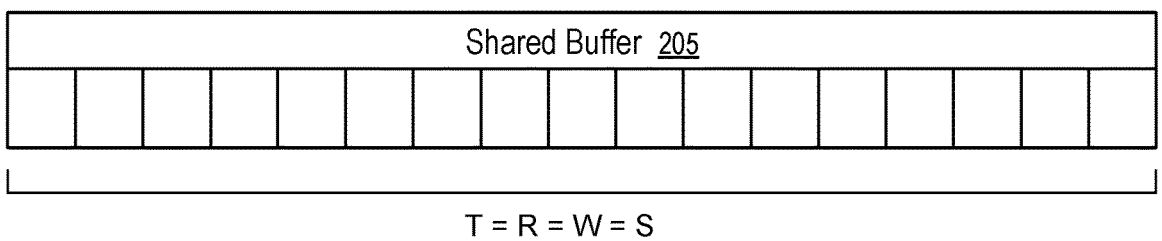

FIGS. 3A-3C illustrate example buffer configurations in accordance with some embodiments of the present disclosure.

A dedicated read buffer 201 in FIGS. 3A-3B has a number of read credits. Each read credit represents a predetermined amount of read buffer capacity for buffering a read request and its data retrieved from an address of the read request. No write requests and their data can be stored in the read buffer 201.

A dedicated write buffer 203 in FIGS. 3A-3B has a number of write credits. Each write credit represents write buffer capacity of the predetermined amount for buffering a write command and its data to be stored in an address of the write request. No read requests and their data can be stored in the write buffer 203.

A shared buffer 205 in FIGS. 3B-3C has a number of shared credits. The shared buffer 205 can be used to store write requests and their data, read request and their data, or a combination of read requests and write requests and their data. Each shared credit representing write buffer capacity of the predetermined amount can be used as a read credit or a write credit.

FIG. 3A illustrates a buffer configuration in which the memory sub-system 110 includes a dedicated read buffer 201 and a dedicated write buffer 203. The total credits T is equal to the sum of W write credits and R read credits.

FIG. 3B illustrates a buffer configuration in which the memory sub-system 110 includes a dedicated read buffer 201, a dedicated write buffer 203, and a shared buffer 205. The number of read credits R is equal to the combined capacity of the dedicated read buffer 201 and the shared buffer 205; and the number of write credits W is equal to the combined capacity of the dedicated write buffer 203 and the shared buffer 205. The total credits T is the combined capacities of the dedicated read buffer 201, the dedicated write buffer 203, and the shared buffer 205. The total credits T is equal to the sum of W write credits and R read credits minus the overlapping S shared credits.

Based on the capacity S of the shared buffer 205 is known, the available read credits r for transmitting further read requests can be calculated from the available total credits t and the available write credit w. For example, $r = t - \min(w, S)$.

Based on the capacity S of the shared buffer 205 is known, the available write credits w for transmitting further write requests can be calculated from the available total credits t and the available read credit r. For example, $w = t - \min(r, S)$.

Based on the capacity S of the shared buffer 205 is known, the available total credits t for transmitting further write/read requests can be calculated from the available write credits w and the available read credit r. For example, $t = w + r - \min(r, w, S)$.

FIG. 3C illustrates a buffer configuration in which the memory sub-system 110 includes a shared buffer 205, but no dedicated read buffer or write buffer. In the example of FIG. 3C, the number of read credits R, the number of write credits W, and the total number of credits T are equal to the capacity S of the shared buffer 205. The available total credits t for transmitting further write/read requests, the available write credits w, the available read credit r are equal to each other.

When the memory sub-system 110 receives a read request from the host system 120, the buffer manager 113 can store the read request in the read buffer 201 if available, or store the read request in the shared buffer 205 when no capacity in read buffer 201 is available. After the media controller 115 retrieves data requested by the read request and buffers the retrieved data, the media controller 115 can send a response signal to cause the memory controller 116 to receive the data from the media controller 115. After the retrieve data has been transmitted from the memory sub-system 110 to the host system 120, the read request and its data can be cleared from the read buffer 201 or the shared buffer 205.

When the memory sub-system 110 receives a write request from the host system 120, the buffer manager 113 can store the write request and its data in the write buffer 203 if available, or store the write request in the shared buffer 205 when no capacity in write buffer 203 is available. After the media controller 115 completes storing the data of the write request in the memory components 109A to 109N, the write request and its data can be cleared from the write buffer 203 or the shared buffer 205.

In some embodiments, the shared buffer 205 can be omitted (e.g., as illustrated in FIG. 3A). In other embodiments, the dedicated read buffer 201 and/or the dedicated write buffer 203 can be omitted (e.g., as illustrated in FIGS. 3B and 3C). The dedicated read buffer 201 and/or the dedicated write buffer 203 can have different capacities. The buffer manager 113 can dynamically partition a buffer memory into a read buffer 201, a write buffer 203, and/or a shared buffer 205.

The buffer manager 113 can count the write credits reclaimed from the write requests completed in the memory sub-system 110 and allocate the reclaimed write credits as write credit increments transmitted from the memory sub-system 110 to the host system 120. For example, the write credit increments can be transmitted using the metadata bus 127 in response to a send command from the host system 120 in accordance with the JEDEC NVDIMM-P Bus Protocol.

The request manager 112 can track the available read credits for transmitting further read requests, the available write credits for transmitting further write requests, and/or the available total credits for transmitting further read/write requests.

The request manager 112 can decrement the available read credits and/or the available total credits when a read request is transmitted to the memory sub-system 110. The request manager 112 can increment the available read credits and/or the available total credits when the data requested in the read request is received from the memory sub-system 110.

The request manager 112 can decrement the available write credits and/or the available total credits when a write request is transmitted to the memory sub-system 110. The request manager 112 can increment the available write credits and/or the available total credits in accordance with the write credit increments transmitted from the memory sub-system 110 to the host system 120.

Further, when the available read credits are reduced to the total capacity S of the shared buffer 205, further reduction for a read request causes equal reduction in the available write credits. In such a situation, the use of the shared buffer 205 for a read request also reduces the available capacity of the shared buffer 205 for receiving write requests.

Similarly, when the available write credits are reduced to the total capacity S of the shared buffer 205, further reduction for a write request causes equal reduction in the available read credits. In such a situation, the use of the shared buffer 205 for a write request also reduces the available capacity of the shared buffer 205 for receiving write requests.

Alternatively, the request manager 112 does not reduce the write credits used by a read request in the shared buffer 205 and does not reduce the read credits used by a write request in the shared buffer 205. The request manager 112 tracks available read credits, available write credits, and available total credits. To prevent buffer overflow, the request manager 112 does not transmit a read request when the size of the read request exceeds either the available read credits or the available total credits. Similarly, the request manager 112 does not transmit a write request when the size of the write request exceeds either the available write credits or the available total credits.

For example, the request manager 112 can track the available read credits r without taking into account of the share buffer 205 used by write request; and the request manager 112 can track the available write credits w without taking into account of the share buffer 205 used by read request. Thus, the share buffer 205 used by write request can be calculated as min (S−w, 0); and the share buffer 205 used by read request can be calculated as min (S−r, 0). Thus, the actual amount of available read credits is r−min (S−w, 0); and the actual amount of available write credits is w−min (S−r, 0).

The request manager 112 can be configured to track and count particular types of credits depending on the buffer configuration. For example, where the memory sub-system 110 includes a dedicated read buffer 201 and a dedicated write buffer 203, but no shared buffer, as in FIG. 3A, the request manager 112 can track available read credits and available write credits, without tracking available total credits. Alternatively, the request manager 112 can track available total credits and available write credits and calculate the available read credits from the difference between the available total credits and the available write credits.

In another example, when the memory sub-system 110 includes a shared buffer 205, but no dedicated read buffer or dedicated write buffer (or when the read buffer 201 and the write buffer 203 are full), as in FIG. 3C, the request manager 112 can track a single one of available read credits, available write credits, or available total credits, since they are equal to each other.

FIGS. 4-9 show sequence diagrams illustrating examples of buffer capacity tracking in conjunction with a read operation or a write operation in accordance with some embodiments of the present disclosure. The buffer manager 113 and the request manager 112 can use a combination of the sequences illustrated in FIGS. 4-9.

FIGS. 4-9 are described with reference to communications between, and operations by, a host system 120 and a memory sub-system 110 illustrated in FIGS. 1 and 2 in connection with buffer configurations illustrated in FIGS. 3A-3C. Some or all of the operations of the host system 120 can be performed by the memory controller 116 in general and at least in part by the request manager 112 in particular. Some or all of the operations of the memory sub-system 110 can be performed by the media controller 115 in general and at least in part by the buffer manager 113 in particular.

Figure 4:
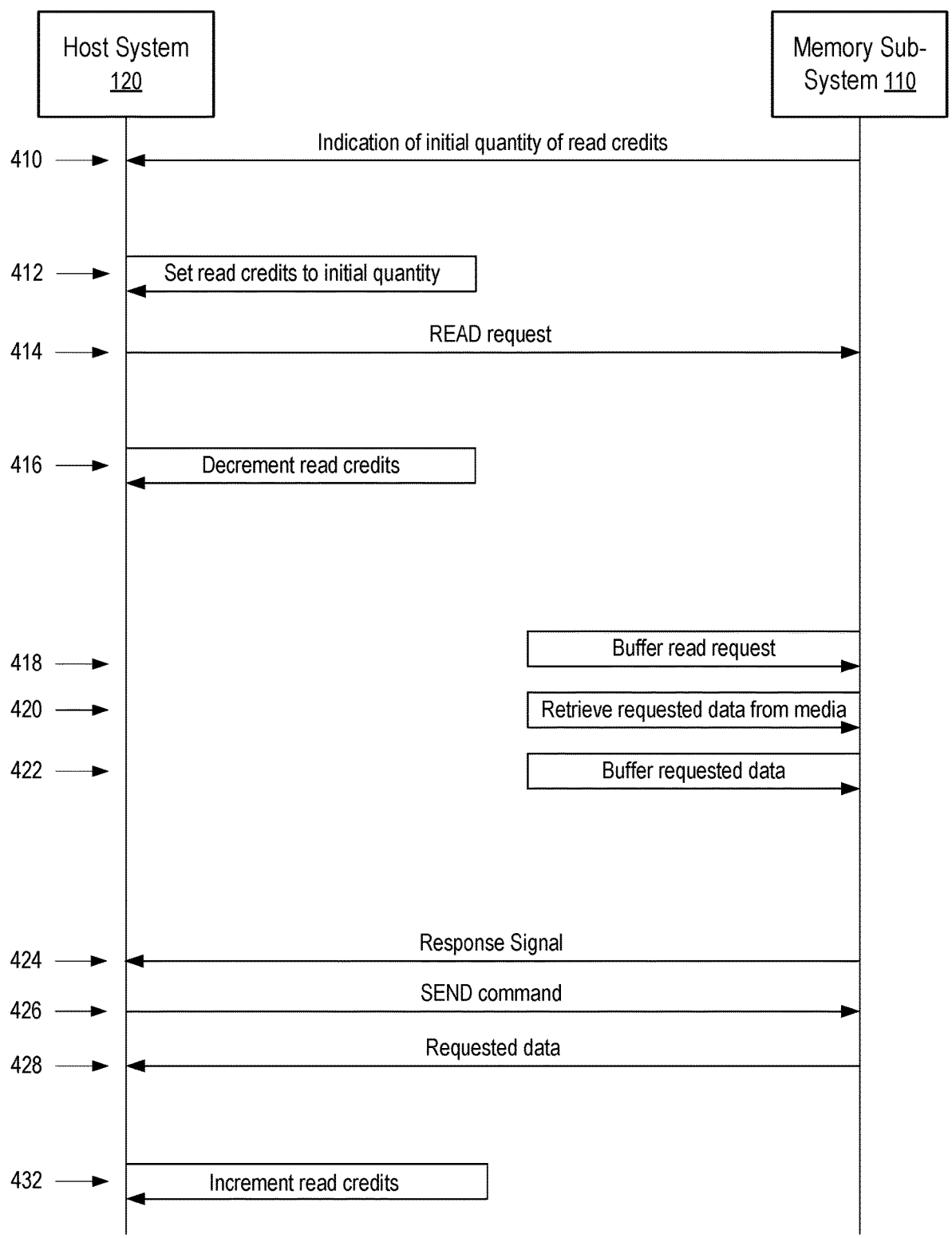
FIGS. 4-9 show sequence diagrams illustrating examples of buffer capacity tracking in conjunction with a read operation or a write operation in accordance with some embodiments of the present disclosure.

FIG. 4 illustrates the tracking of available read credits.

In operation 410, the memory sub-system 110 transmits, and the host system 120 receives, an indication of an initial quantity of read credits available in the memory sub-system 110 to accept read requests from the host system 120. Alternatively, the host system 120 can receive an indication of the initial quantity of read credits from a source other than the memory sub-system 110, such as from a device driver stored and running on the host system 120, a memory location storing a configuration parameter for the memory sub-system 110, etc.

In operation 412, the host system 120 sets a quantity of available read credits to equal the initial quantity received in operation 410. As a result, the host system 120 (e.g., a request manager 112 thereof) can know the total amount of buffer capacity that the memory sub-system 110 has in buffering read requests and their data.

In operation 414, the host system 120 transmits, and the memory sub-system 110 receives, a read request for specific data stored in media, or memory components 109A to 109N, of the memory sub-system 110. An example of the read request is a SREAD or XREAD command and an associated XADR command identified in the JEDEC NVDIMM-P Bus Protocol. The read request can include an indication of the size of requested data that can be required in the memory sub-system 110 before the requested data is being transmitted to the host system 120.

The host system 120 transmits the read request when the currently available read credits as tracked at the host system 120 is no less than the size of requested data. The currently available read credits as tracked at the host system 120 being less than the size of requested data can prevent the host system 120 from transmitting the read request in operation 414.

In operation 416, the host system 120 decrements its quantity of available read credits in response to transmitting the read request in operation 414. The quantity that is decremented is in accordance with the size of the requested data.

In operation 418, the memory sub-system 110 buffers the read request (e.g., in the read buffer 201 and/or the shared buffer 205).

In operation 420, the memory sub-system 110 retrieves the requested data from the media of the memory sub-system 110.

In operation 422, the memory sub-system 110 buffers the requested data for transmission to the host system 120 (e.g., in the read buffer 201 and/or the shared buffer 205).

In operation 424, the memory sub-system 110 transmits, and the host system 120 receives, a response signal, such as an RSPx_n signal identified in the JEDEC NVDIMM-P Bus Protocol.

In operation 426, the host system 120 transmits, and the memory sub-system 110 receives, a send command requesting the memory sub-system 110 to transmit the data that is indicated to be ready for transmission by the response signal. An example of the send command is a SEND command identified in the JEDEC NVDIMM-P Bus Protocol.

In operation 428, the memory sub-system 110 transmits, and the host system 120 receives, the data requested in the read request of operation 414. As part of, or after, transmitting the requested data, the memory sub-system 110 can clear from the buffer (e.g., 201 and/or 205) the read request and the data requested in the read request.

In operation 432, the host system 120 increments the quantity of available read credits in response to receiving the requested data in operation 426. The receipt of the requested data indicates to the host system 120 that the buffer capacity used for the read request have been freed and available/usable for further read requests.

In general, the host system 120 and the memory sub-system 110 can have other communications before the transmission of the read request of operation 414, between the read request of operation 414 and the retrieval of the requested data of operation 420, between the retrieval of the requested data of operation 420 and the response signal of operation 424, and between the response signal of operation 424 and the send command of operation 426, etc. Such communications can include another read request, a write request, a status query, etc.

Certain operations illustrated in FIG. 4 can be repeated for each read request, such that the host system 120 continuously tracks available read credits as read requests are transmitted and serviced. For example, operations 414 to 432 can be performed for each read request and, as noted above, the host system 120 can transmit a read request only when sufficient read credits are available for the read request.

In FIG. 4, the host system 120 explicitly tracks read credits. As a result, the host system 120 can send read requests only when sufficient read credits are available for the read request. Additionally, the memory sub-system 110 does not have to explicitly track read credits. In other embodiments, the memory sub-system 110 can optionally track read credits and can provide information on the quantity of available read credits to the host system 120. Furthermore, in embodiments, the memory sub-system 110 can be configured to reject a read request if insufficient read buffer capacity is currently available for the read request, and to accept the read request when sufficient read buffer capacity is available for the read request.

Figure 5:
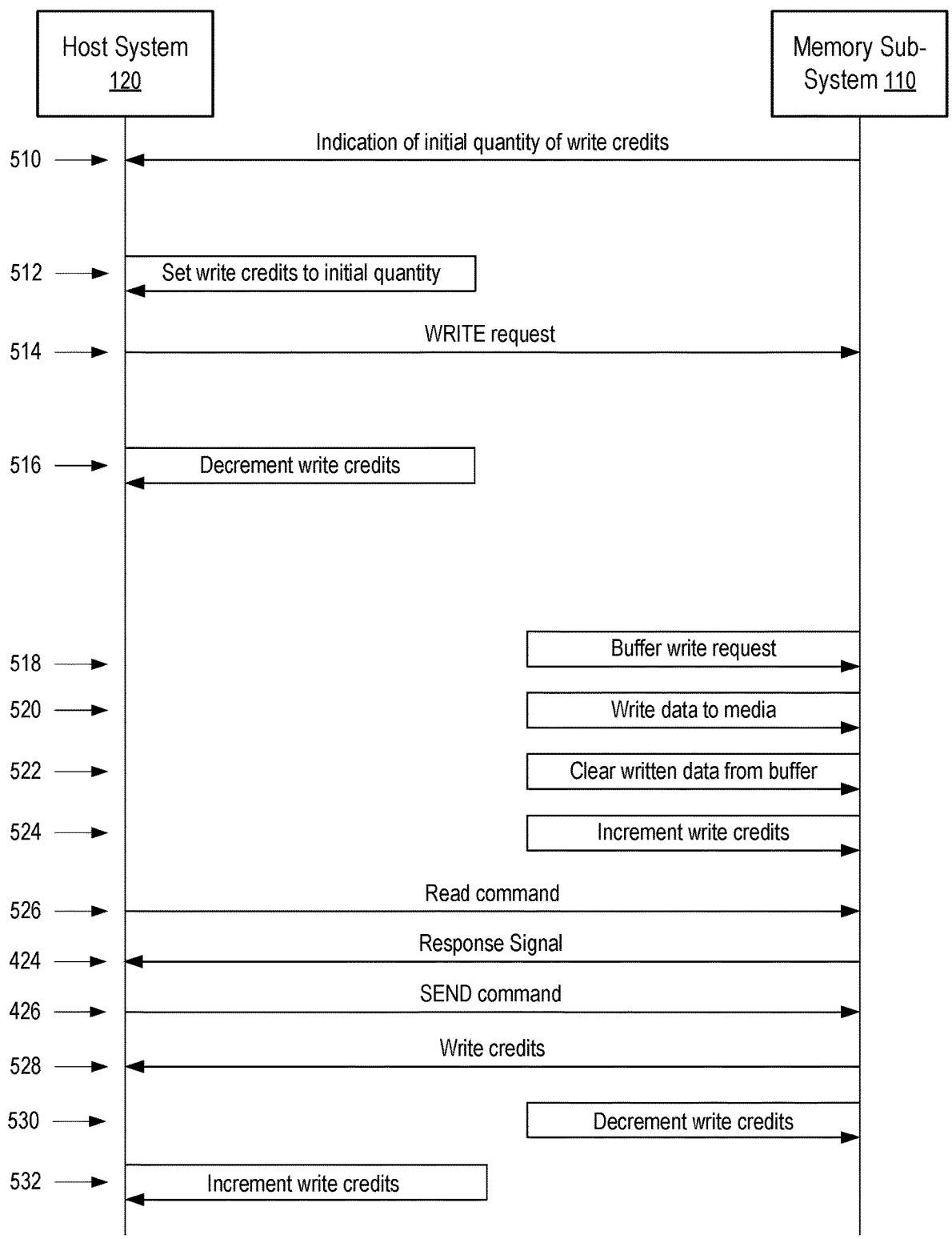

FIG. 5 illustrates the tracking of available write credits.

In operation 510, the memory sub-system 110 transmits, and the host system 120 receives, an indication of an initial quantity of write credits available in the memory sub-system 110 to accept write requests from the host system 120. Alternatively, the host system 120 can receive an indication of the initial quantity of write credits from a source other than the memory sub-system 110, such as from a device driver stored and running on the host system 120, a memory location storing a configuration parameter for the memory sub-system 110, etc.

In operation 512, the host system 120 sets a quantity of available write credits to equal the initial quantity received in operation 510. As a result, the host system 120 (e.g., a request manager 112 thereof) can know the total amount of buffer capacity that the memory sub-system 110 has in buffering write requests and their data.

In operation 514, the host system 120 transmits, and the memory sub-system 110 receives, a write request to store specified data to media, or memory components 109A to 109N, of the memory sub-system 110. An example of the write request is a WRITE, XWRITE, PWRITE command and an associated XADR command identified in the JEDEC NVDIMM-P Bus Protocol. The data to be stored by the write request determines the size of write request.

The host system 120 transmits the write request when the currently available write credits as tracked at the host system 120 is no less than the size of write request. The currently available write credits as tracked at the host system 120 being less than the size of the write request can prevent the host system 120 from transmitting the write request in operation 514.

In operation 516, the host system 120 decrements its quantity of available write credits in response to transmitting the write request in operation 514. The quantity that is decremented is in accordance with the size of the write request.

In operation 518, the memory sub-system 110 buffers the write request (e.g., in the read buffer 201 and/or the shared buffer 205).

In operation 520, the memory sub-system 110 writes the data to the media of the memory sub-system 110.

In operation 522, the memory sub-system 110 clears the write request and the written data from the buffer (e.g., in the read buffer 201 and/or the shared buffer 205)

In operation 524, the memory sub-system 110 increments its quantity of available write credits in response to completing the write request received in operation 514. The quantity that is incremented is in accordance with the size of the completed write request.

In operation 526, the host system 120 transmits, and the memory sub-system 110 receives, a read command requesting the memory sub-system 110 to provide information, including write credits. An example of the read command is a SREAD and XREAD (and status_read) identified in the JEDEC NVDIMM-P Bus Protocol.

In operation 424, the memory sub-system 110 transmits, and the host system 120 receives, a response signal, such as an RSPx_n signal identified in the JEDEC NVDIMM-P Bus Protocol.

In operation 426, the host system 120 transmits, and the memory sub-system 110 receives, a send command requesting the memory sub-system 110 to transmit the data that is indicated to be ready for transmission by the response signal. An example of the send command is a SEND command identified in the JEDEC NVDIMM-P Bus Protocol.

In operation 528, the memory sub-system 110 transmits, and the host system 120 receives, write credits. When the response signal is for a read request that causes the memory sub-system 110 to retrieve data from the media of the memory sub-system 110, the memory sub-system 110 also transmits, and the host system 120 receives, the data requested in the read request of operation 414, as in operation 428 illustrated in FIG. 4. The write credits sent from the memory sub-system 110 to the host system in operation 528 can include the write credit increments as a result of completing the write request of operation 514 and/or another write request.

In operation 530, the memory sub-system 110 decrements its quantity of available write credits according to the write credits transmitted to the host system 120 in operation 528.

In operation 532, the host system 120 increments its quantity of available write credits according to the write credits transmitted to the host system 120 in operation 528.

In general, the host system 120 and the memory sub-system 110 can have other communications before the transmission of the write request of operation 514, between the write request of operation 514 and the writing of the data in operation 520, between the writing of the data in operation 520 and the response signal of operation 424, and between the response signal of operation 424 and the send command of operation 426, etc. Such communications can include another write request, a read request, a status query, etc.

Certain operations illustrated in FIG. 5 can be repeated for each write request, such that the host system 120 continuously tracks available write credits as write requests are transmitted and serviced and as write credits are transmitted back to the host system. For example, operations 514 to 532 can be performed for each write request and, as noted above, the host system 120 can transmit a write request only when sufficient write credits are available for the write request.

In FIG. 5, the memory sub-system 110 explicitly tracks write credit increments generated from completed write requests, and sends updates write credit increments to the host system 120 in response to send commands from the host system 120. The memory sub-system 110 can reject a write request when insufficient write credits are available for the write request. In some embodiments, the memory sub-system 110 can identify to the host system 120 the completed write requests such that the host system 120 can increment its write credits for the completed write requests.

Figure 6:
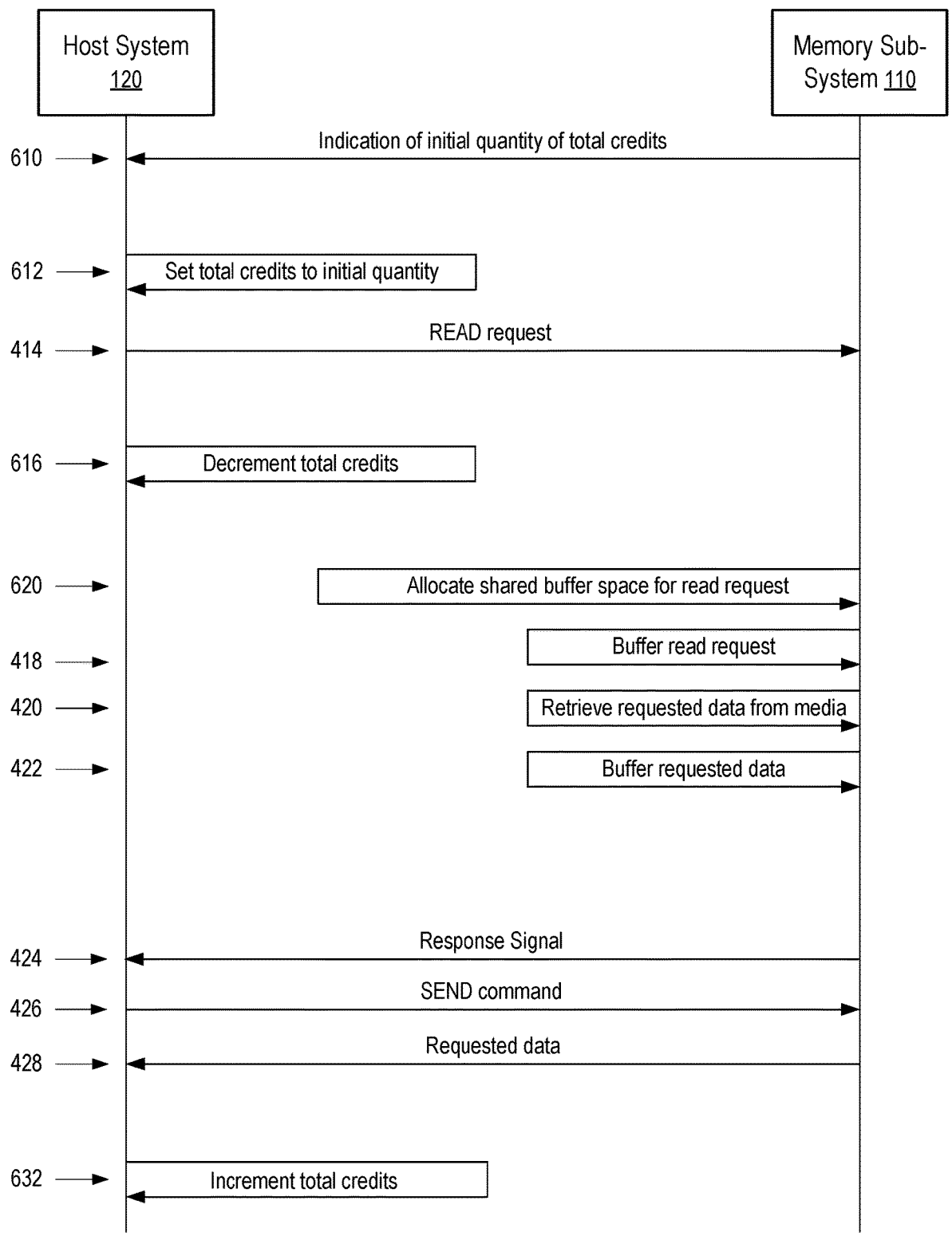

FIG. 6 illustrates the tracking of available total credits in connection with a read request.

In operation 610, the memory sub-system 110 transmits, and the host system 120 receives, an indication of an initial quantity of total credits available in the memory sub-system 110 to accept read/write requests from the host system 120. Alternatively, the host system 120 can receive an indication of the initial quantity of total credits from a source other than the memory sub-system 110, such as from a device driver stored and running on the host system 120, a memory location storing a configuration parameter for the memory sub-system 110, etc.

In operation 612, the host system 120 sets a quantity of available total credits to equal the initial quantity received in operation 610. As a result, the host system 120 (e.g., a request manager 112 thereof) can know the total amount of buffer capacity that the memory sub-system 110 has in buffering read/write requests and their data.

In operation 414, the host system 120 transmits, and the memory sub-system 110 receives, a read request for specific data stored in media, or memory components 109A to 109N, of the memory sub-system 110, as in FIG. 4.

In operation 616, the host system 120 decrements its quantity of available total credits in response to transmitting the read request in operation 414. The quantity that is decremented is in accordance with the size of the requested data.

In operation 620, the memory sub-system 110 optionally allocates shared buffer space for the read request (e.g., when the read buffer 201 is full, or not configured in the memory sub-system 110).

In operations 418 to 428, the memory sub-system 110 completes the read request and provides the requested data to the host system 120, as in FIG. 4.

In operation 632, the host system 120 increments the quantity of available read credits in response to receiving the requested data in operation 426. The receipt of the requested data indicates to the host system 120 that the buffer capacity used for the read request have been freed and available/usable for further read/write requests.

In general, the host system 120 and the memory sub-system 110 can have other communications before the read request of operation 414, between the read request of operation 414 and the retrieval of the requested data of operation 420, between the retrieval of the requested data of operation 420 and the response signal of operation 424, and between the response signal of operation 424 and the send command of operation 426, etc. Such communications can include another read request, a write request, a status query, etc.

In some instances, at least a portion of the total credits can be used for either a read request or a write request. For example, such a portion of the total credits can be from a shared buffer 205. For example, when neither of the read buffer 201 and the write buffer 203 is full, such a portion of the total credits can be either from the read buffer 201 or from the write buffer 203. In such instances, the host system 120 can transmit the read request in operation 414 when its quantity of total credits is no less than the size of the read request. When the quantity of total credits tracked at the host system 120 is less than the size of the read request, the host system 120 does not transmit the read request.

Figure 7:
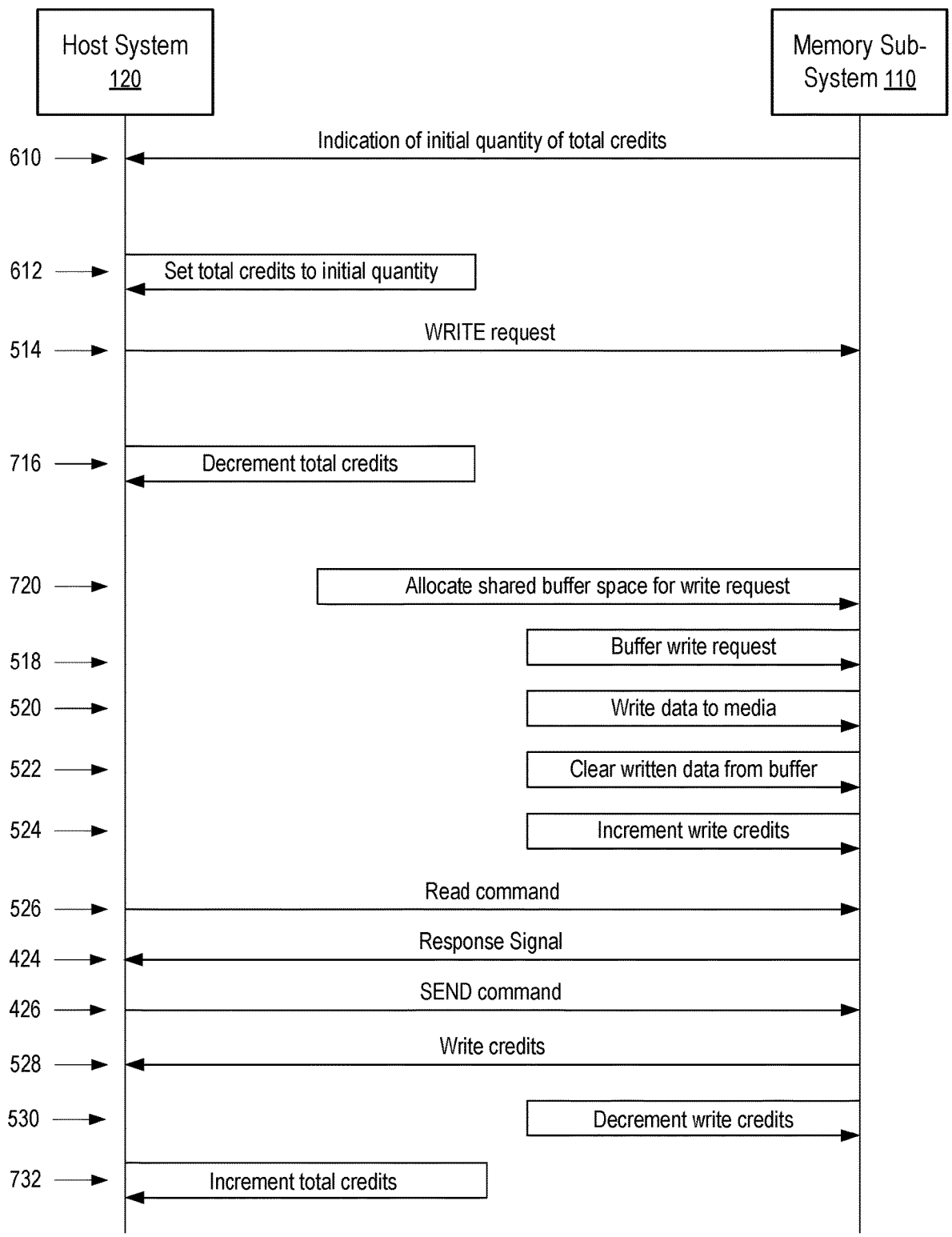

FIG. 7 illustrates the tracking of available total credits in connection with a write request.

In operations 610 and 612, the host system 120 sets the initial quantity of available total credits, as in FIG. 6.

In operation 514, the host system 120 transmits, and the memory sub-system 110 receives, a write request to store specified data to media, or memory components 109A to 109N, of the memory sub-system 110, as in FIG. 5.

In operation 716, the host system 120 decrements its quantity of available total credits in response to transmitting the write request in operation 514. The quantity that is decremented is in accordance with the size of the write request.

In operation 720, the memory sub-system 110 optionally allocates shared buffer space for the write request (e.g., when the read buffer 201 is full, or not configured in the memory sub-system 110).

In operations 518 to 530, the memory sub-system 110 processes the write request and sends write credits back to the host system 120, as in FIG. 5.

In operation 732, the host system 120 increments the quantity of available read credits in response to receiving write credits in operation 528.

In general, the host system 120 and the memory sub-system 110 can have other communications before the write request of operation 514, between the write request of operation 514 and the writing of the data in operation 520, between the writing of the data in operation 520 and the response signal of operation 424, and between the response signal of operation 424 and the send command of operation 426, etc. Such communications can include another write request, a read request, a status query, etc.

In some instances, at least a portion of the total credits can be used for either a read request or a write request. For example, such a portion of the total credits can be from a shared buffer 205. For example, when neither of the read buffer 201 and the write buffer 203 is full, such a portion of the total credits can be either from the read buffer 201 or from the write buffer 203. In such instances, the host system 120 can transmit the write request in operation 514 when its quantity of total credits is no less than the size of the write request. When the quantity of total credits tracked at the host system 120 is less than the size of the write request, the host system 120 does not transmit the write request.

In some instances, available read credits as tracked in FIG. 4 or available total credits as tracked in FIGS. 6 and 7 may not be sufficient to determine whether the host system 120 can send a read request. The host system 120 can track both available read credits and available total credits as further discussed below.

Figure 8:
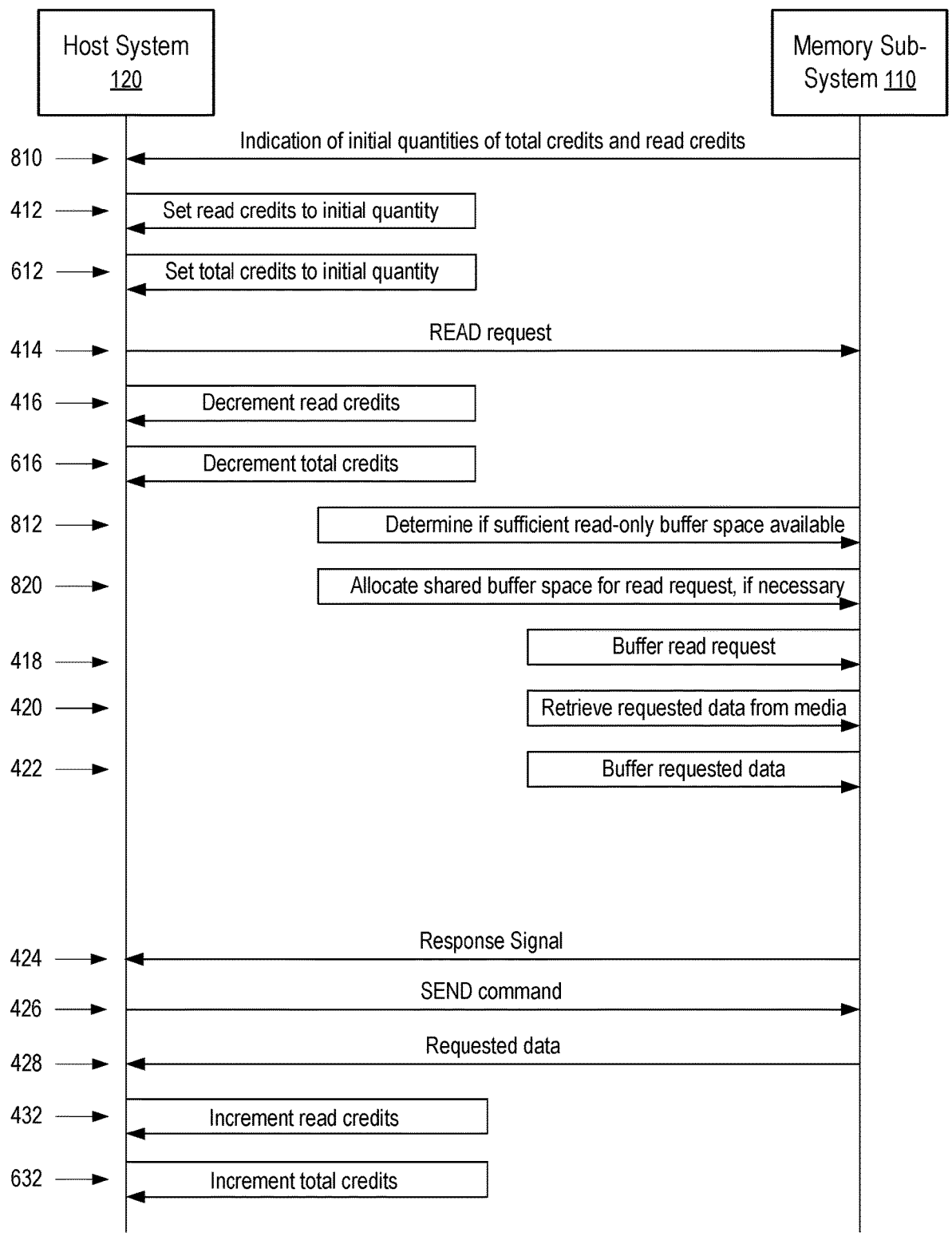

FIG. 8 illustrates the tracking of available total credits and available read credits in connection with a read request.

In operation 810, the memory sub-system 110 transmits, and the host system 120 receives, an indication of an initial quantity of total credits available in the memory sub-system 110 to accept read/write requests from the host system 120, and an indication of an initial quantity of read credits available in the memory sub-system 110 to accept read requests from the host system 120. Alternatively, the host system 120 can receive an indication of the initial quantity of total credits and read credits from a source other than the memory sub-system 110, such as from a device driver stored and running on the host system 120, a memory location storing a configuration parameter for the memory sub-system 110, etc.

In operations 412 and 612, the host system 120 sets a quantity of available read credits to equal the initial quantity received in operation 810, and sets a quantity of available total credits to equal the initial quantity received in operation 810.

In operation 414, the host system 120 transmits, and the memory sub-system 110 receives, a read request for specific data stored in media, or memory components 109A to 109N, of the memory sub-system 110, as in FIG. 4.

In operations 416 and 616, the host system 120 decrements the read credits and total credits, as in FIGS. 4 and 6.

In operation 812, the memory sub-system 110 determines whether the read buffer 201 has sufficient capacity for the read request; and if not, in operation 820, the memory sub-system 110 allocates shared buffer capacity for the read request.

In operations 418 to 428, the memory sub-system 110 completes the read request and provides the requested data to the host system 120, as in FIGS. 4 and 6.

In operations 432 and 632, the host system 120 increments the quantity of available read credits and the quantity of available total credits in response to receiving the requested data in operation 426, as in FIGS. 4 and 6.

In FIG. 8, the host system 120 can transmit the read request in operation 414 when its quantity of available total credits and its quantity of available read credits are both no less than the size of the read request. When either the quantity of total credits tracked at the host system 120 is less than the size of the read request, or the quantity of read credits tracked at the host system 120 is less than the size of the read request, the host system 120 does not transmit the read request.

Figure 9:
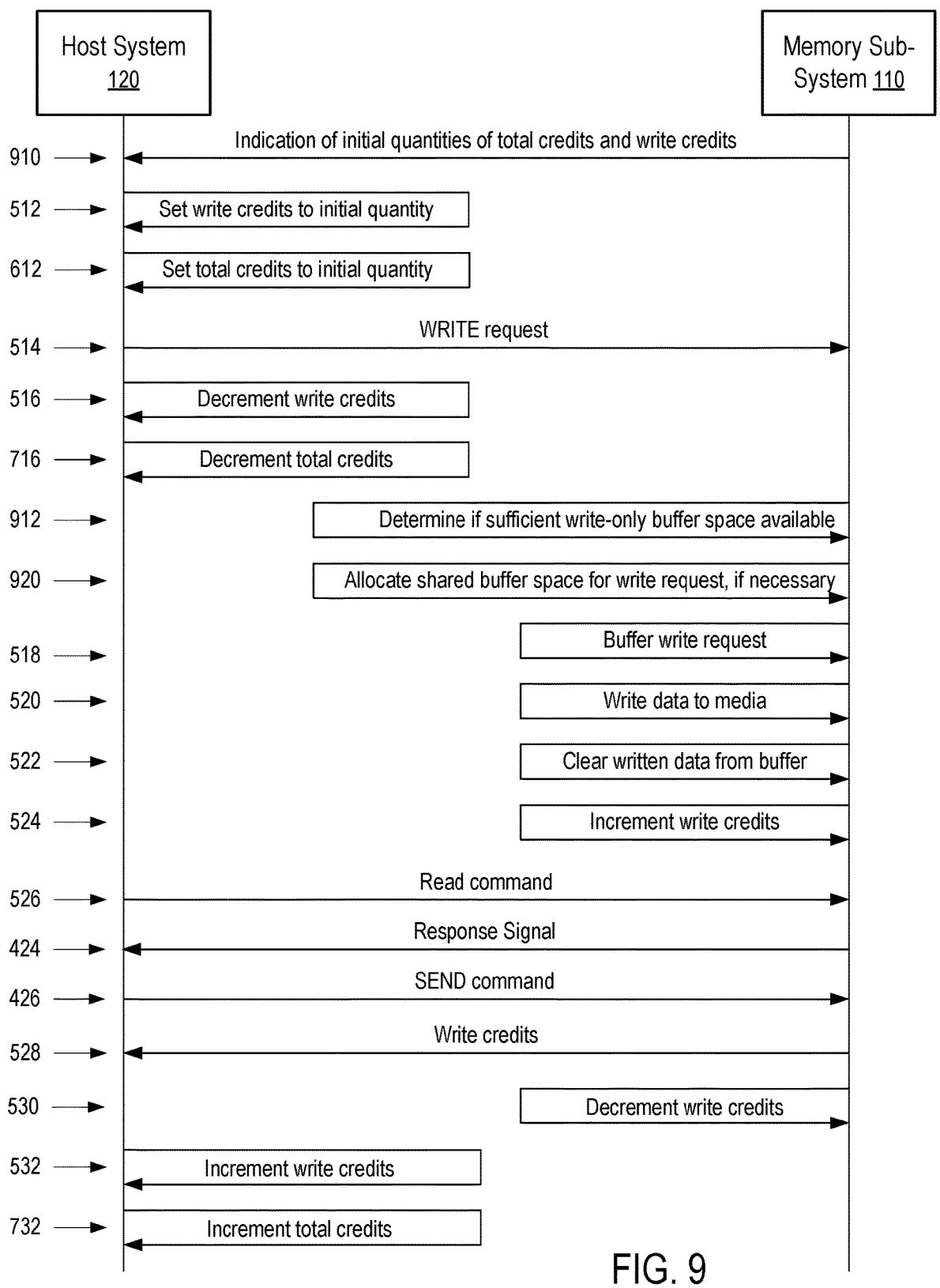

FIG. 9 illustrates the tracking of available total credits and available read credits in connection with a write request.

In operation 910, the memory sub-system 110 transmits, and the host system 120 receives, an indication of an initial quantity of total credits available in the memory sub-system 110 to accept read/write requests from the host system 120, and an indication of an initial quantity of write credits available in the memory sub-system 110 to accept write requests from the host system 120. Alternatively, the host system 120 can receive an indication of the initial quantity of total credits and read credits from a source other than the memory sub-system 110, such as from a device driver stored and running on the host system 120, a memory location storing a configuration parameter for the memory sub-system 110, etc.

In operations 512 and 612, the host system 120 sets a quantity of available write credits to equal the initial quantity received in operation 910, and sets a quantity of available total credits to equal the initial quantity received in operation 910.

In operation 514, the host system 120 transmits, and the memory sub-system 110 receives, a write request to store specified data to media, or memory components 109A to 109N, of the memory sub-system 110, as in FIG. 5.

In operations 516 and 716, the host system 120 decrements the read credits and total credits, as in FIGS. 5 and 7.

In operation 912, the memory sub-system 110 determines whether the write buffer 203 has sufficient capacity for the write request; and if not, in operation 920, the memory sub-system 110 allocates shared buffer capacity for the write request.

In operations 518 to 530, the memory sub-system 110 processes the write request and sends write credits back to the host system 120, as in FIGS. 5 and 7.

In operations 532 and 732, the host system 120 increments the quantity of available write credits and available total credits in response to receiving write credits in operation 528.

In FIG. 9, the host system 120 can transmit the read request in operation 514 when its quantity of available total credits and its quantity of available write credits are both no less than the size of the write request. When either the quantity of total credits tracked at the host system 120 is less than the size of the write request, or the quantity of write credits tracked at the host system 120 is less than the size of the write request, the host system 120 does not transmit the write request.

In some instances, when the host system 120 has the indication of initial quantity of total credits T, read credits R, and write credits W, the host system 120 can compute the capacity S of the shared buffer 205 according to $S=W+R-T$. Alternatively, the capacity S of the shared buffer 205 can be determined from a configuration parameter stored in the computer system.

Subsequent, the request manager 112 of the host system 120 can determine whether the read buffer 201 is full based on comparing the available read credits r to the capacity S of the shared buffer 205. If $r<S$, the read buffer 201 is full; and additional capacity used for a read request is from the shared buffer 205, which reduces the available write credits. When the quantity of available write credits is decreased for the use of the shared buffer 205 by a read request, the quantity of available write credits reflects the actual write buffer capacity available for the transmission of further write requests; and it is not necessary to separately track the total credits as in FIG. 9.

Similarly, the request manager 112 of the host system 120 can determine whether the write buffer 203 is full based on comparing the available write credits w to the capacity S of the shared buffer 205. If $w<S$, the write buffer 203 is full; and additional capacity used for a write request is from the shared buffer 205, which reduces the available read credits. When the quantity of available read credits is decreased for the use of the shared buffer 205 by a write request, the quantity of available read credits reflects the actual read buffer capacity available for the transmission of further read requests; and it is not necessary to separately track the total credits as in FIG. 8.

When the host system 120 has a read credit increment (e.g., in response to receiving the data requested by a read request), the request manager 112 of the host system 120 can determine whether the increased capacity is in the shared buffer 205. When the current amount of read credits is less than S, the increase of the available read credits up to S is in the shared buffer 205. The increased read credits in the shared buffer 205 also increase the available write credits.

Similarly, when the host system 120 has a write credit increment (e.g., in response to receiving write credits from the memory sub-system 110), the request manager 112 of the host system 120 can determine whether the increased capacity is in the shared buffer 205. When the current amount of write credits is less than S, the increase of the available write credits up to S is in the shared buffer 205. The increased write credits in the shared buffer 205 also increase the available read credits.

Figure 10:
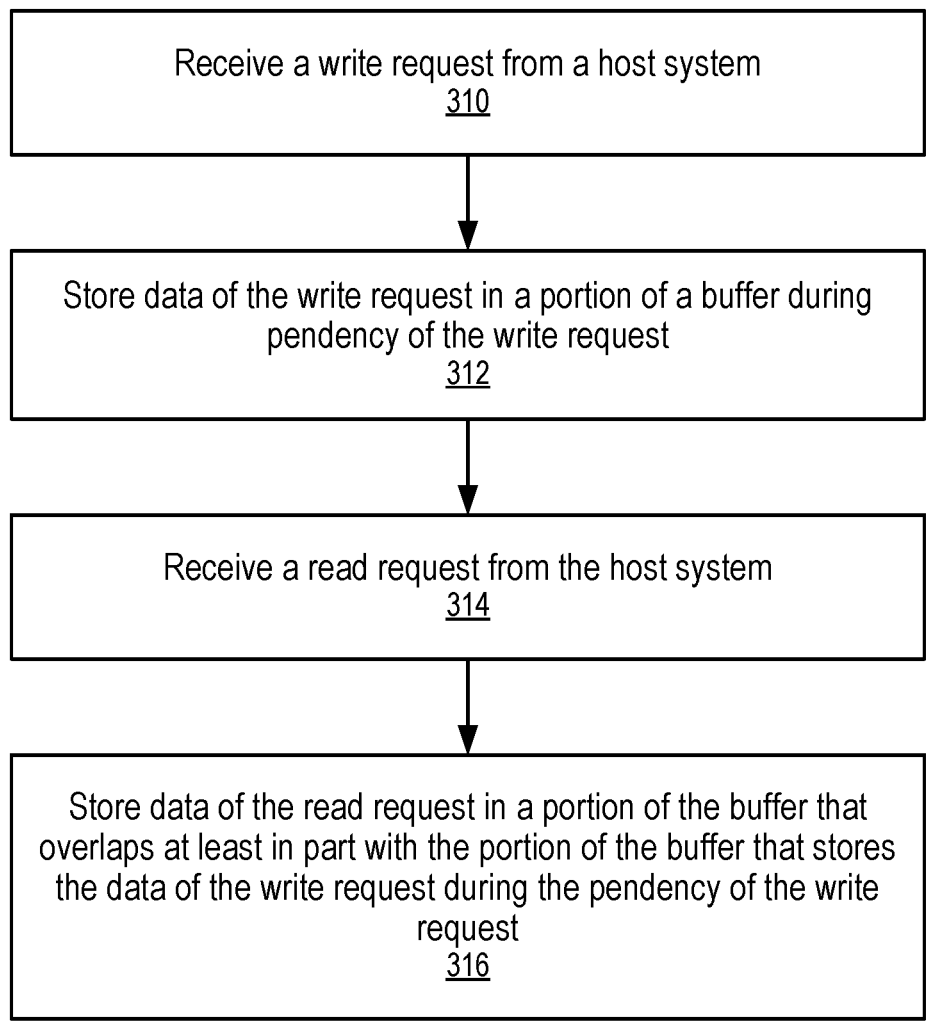
FIG. 10 is a flow diagram of an example method to manage a buffer shared for read requests and write requests in accordance with some embodiments of the present disclosure.

FIG. 10 is a flow diagram of an example method to manage a buffer shared for request requests and write requests in accordance with some embodiments of the present disclosure. The method of FIG. 10 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 10 is performed at least in part by the buffer manager 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, the media controller 115 of the memory sub-system 110 receives a write request from the host system 120.

At block 312, the buffer manager 113 stores data of the write request in a portion of a buffer (e.g., 203 and 205) during pendency of the write request.

At block 314, the media controller 115 of the memory sub-system 110 receives a read request from the host system 120.

At block 316, the buffer manager 113 stores data of the read request in a portion of the buffer (e.g., 201 and 205) that overlaps at least in part with the portion of the buffer (e.g., 203 and 205) that stores the data of the write request during the pendency of the write request.

Thus, at least a same portion of the buffer (e.g., 205) can be used by the buffer manager 113 to buffer a read request and a write request in different time periods of operation of the buffer (e.g., 205).

Figure 11:
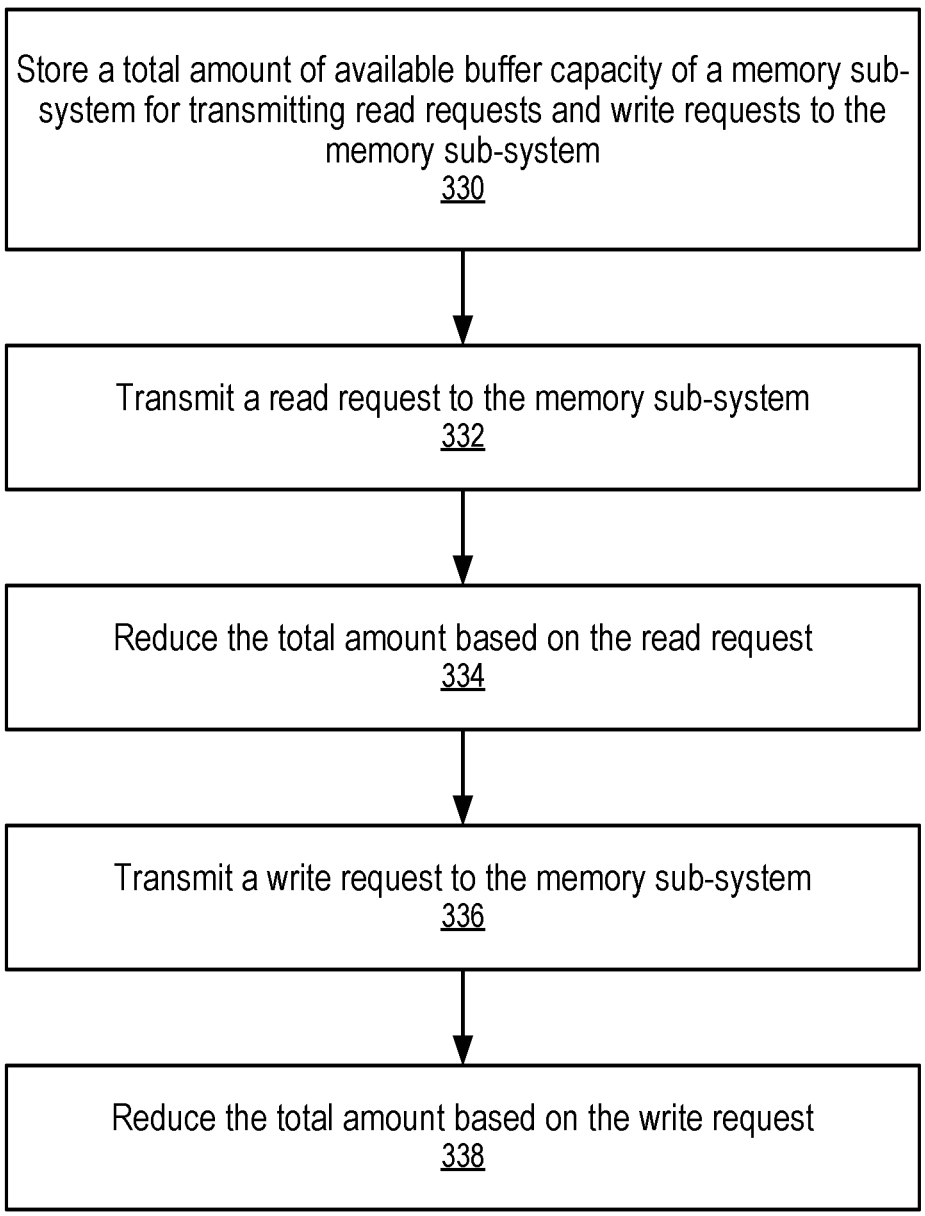
FIGS. 11 and 12 are flow diagrams of example methods to manage requests to a memory subsystem in accordance with some embodiments of the present disclosure.
Figure 12:
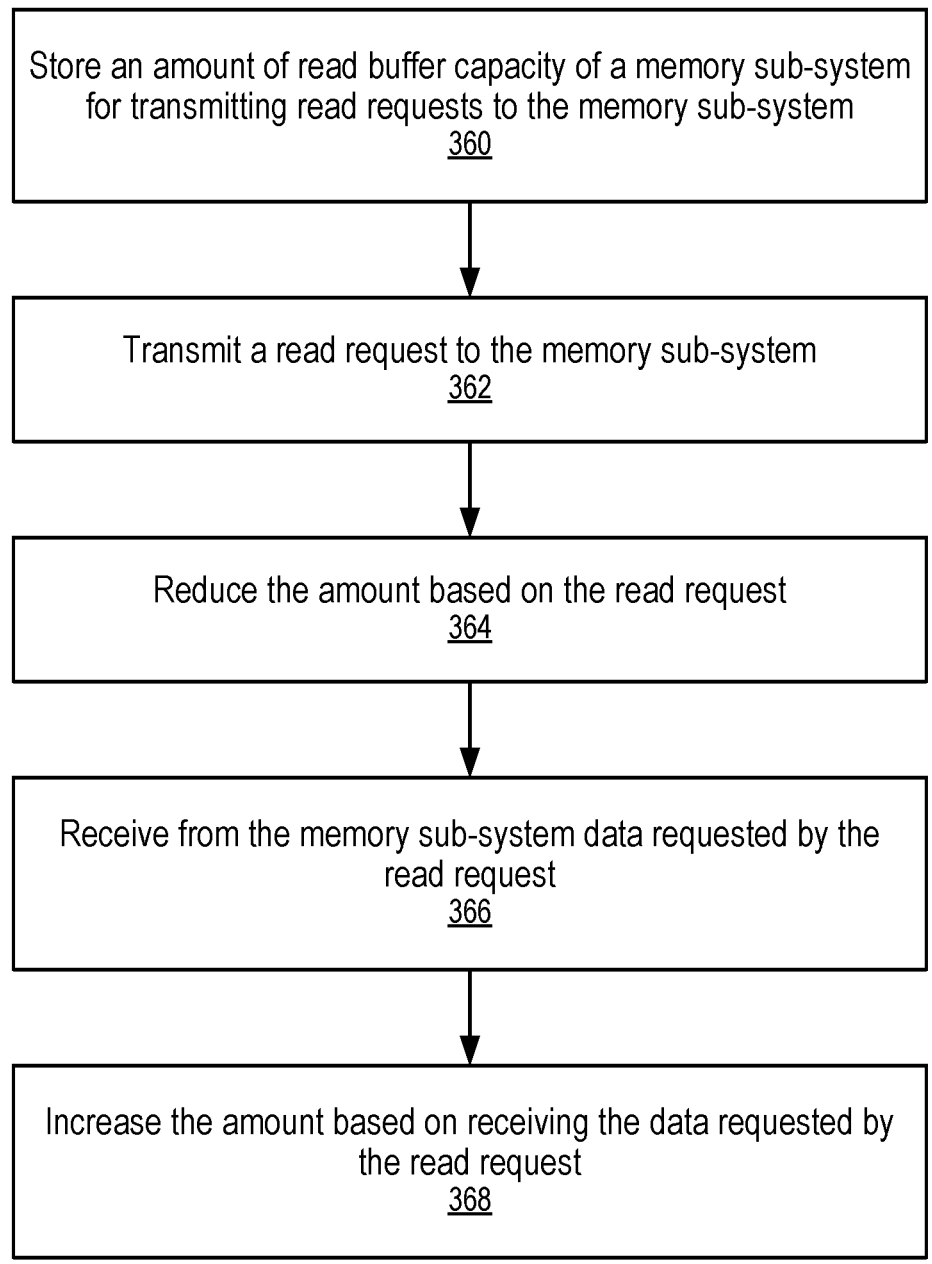

FIGS. 11 and 12 are flow diagrams of example methods to manage requests to a memory subsystem in accordance with some embodiments of the present disclosure. The methods of FIGS. 11 and 12 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 11 or 12 is performed at least in part by the request manager 112 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 330, the request manager 112 stores a total amount of available buffer capacity of a memory sub-system 110 for transmitting read requests and write requests to the memory sub-system 110.

At block 332, the memory controller 116 transmits a read request to the memory sub-system 110.

At block 334, the request manager 112 reduces the total amount based on the read request.

At block 336, the memory controller 116 transmits a write request to the memory sub-system 110.

At block 338, the request manager 112 reduces the total amount based on the write request.

The request manager 112 can increase the total amount of available buffer capacity in response to receiving data requested by the read request, and increase the total amount in accordance with write credit increments communicated from the memory sub-system 110. The request manager 112 can determine whether or not to transmit a read request or a write request, based on whether the current total amount is no less than the size of the read request or the write request.

At block 360, the request manager 112 stores an amount of read buffer capacity of a memory sub-system 110 for transmitting read requests to the memory sub-system 110.

At block 362, the memory controller 116 transmits a read request to the memory sub-system 110.

At block 364, the request manager 112 reduces the amount based on the read request.

At block 366, the memory controller 116 receives from the memory sub-system 110 data requested by the read request.

At block 368, the request manager 112 increases the amount based on receiving the data requested by the read request.

The request manager 112 can determine whether or not to transmit a read request, based on whether the current amount of available read buffer capacity is no less than the size of the read request.

Figure 13:
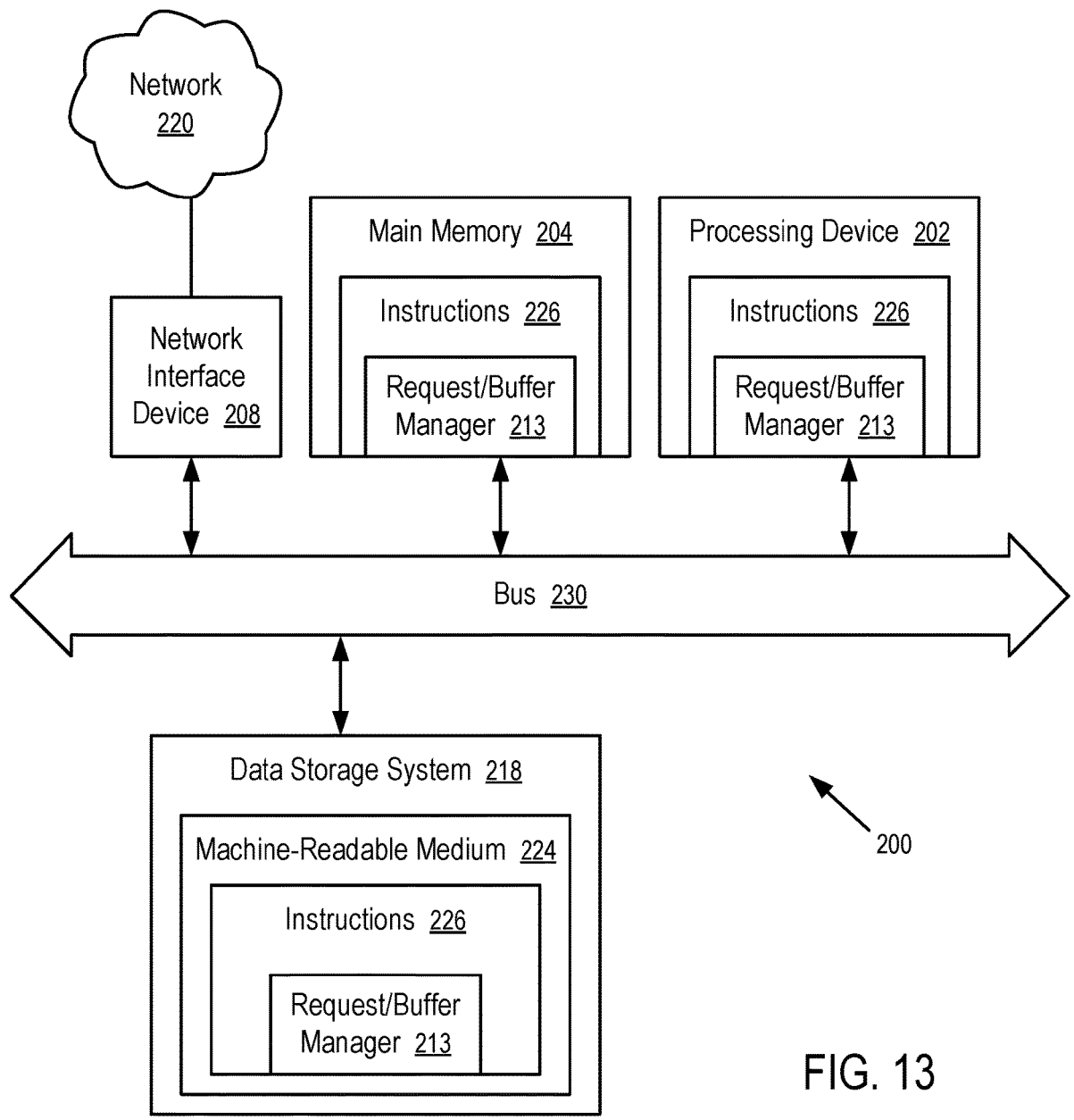
FIG. 13 is a block diagram of an example computer system in which embodiments of the present disclosure can operate.

FIG. 13 illustrates an example machine of a computer system 200 within which a set of instructions, for causing the machine to perform any one or more of the methodologies discussed herein, can be executed. In some embodiments, the computer system 200 can correspond to a host system (e.g., the host system 120 of FIG. 1) that includes, is coupled to, or utilizes a memory sub-system (e.g., the memory sub-system 110 of FIG. 1) or can be used to perform the operations of a request/buffer manager 213 (e.g., to execute instructions to perform operations corresponding to the request manager 112 and/or the buffer manager 113 described with reference to FIGS. 1-12). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit (CPU), or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), a graphics processing unit (GPU), network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory sub-system 110 of FIG. 1.

In one embodiment, the instructions 226 include instructions to implement functionality corresponding to a request/buffer manager 213 (e.g., the request manager 112 and/or the buffer manager 113 described with reference to FIGS. 1-12). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system, comprising:
a plurality of memory components;
a host interface configured to be connected to a host system via a plurality of buses including a command bus, a data bus, a transaction bus, and a metadata bus, the host interface to receive, via the command bus from the host system, first requests to read data from the memory components and second requests to write data to the memory components;
a buffer configured to buffer data associated with the first requests and the second requests prior to completion of execution of the first requests and the second request, wherein at least a portion of the buffer is configured to buffer data for different types of requests in different periods of times, the different types of requests including a first type of requests to read data and a second type of requests to write data; and a processing device, operatively coupled with the plurality of memory components, to:

transmit, through the host interface to the host system, an initial indication representative of first quantities of buffer space available in the buffer to store data associated with requests of the different types to cause the host system to count quantities of buffer spaces available in the memory system to store data associated with the different types of requests based on respective requests transmitted from the host system and responses received in the host system for the respective requests;

receive, via the command bus, a write request from the host system;

store data of the write request in a portion of the buffer of the memory system during a first time period in which the write request is pending in the memory system;

receive, via the command bus, a read request from the host system;

store data of the read request in a portion of the buffer during a second time period in which the read request is pending in the memory system;

reserve a first portion of the buffer, the first portion shared for read requests and write requests;

buffer write requests and read requests in the first portion of the buffer;

reserve a second portion of the buffer;

buffer, in the second portion, read requests but not write requests;

execute the write request;

execute the read request to retrieve first data from the memory components;

transmit, via the transaction bus to the host system, an indication that the first data requested by the read request is available;

receive a command from the host system to send the first data; and transmit, via the metadata bus and in response to the command to send the first data, an indication of a quantity of buffer space released as a result of completion of at least the write request to cause the host system to determine second quantities of buffer space available in the buffer to store data associated with additional requests of the different types;

wherein the portion of the buffer storing the data of the write request overlaps at least in part with the portion of the buffer storing the data of the read request; and wherein the first time period does not overlap with the second time period.

2. The memory system of claim 1, wherein the processing device is further to:

reserve a third portion of the buffer; and buffer, in the third portion, write requests but not read requests.

3. The memory system of claim 2, wherein the memory components include non-volatile memory; and the processing device is to receive the write request and the read request from the host system in accordance with a communication protocol for non-volatile dual in-line memory modules.

4. A method, comprising:

receiving, in a host system from a memory system having a buffer and coupled to the host system via a plurality of buses including a command bus, a data bus, a transaction bus, and a metadata bus, an initial indication representative of amounts of buffer space available in the buffer to store data associated with requests of different types;

storing, in the host system, an amount identifying buffer capacity of the memory system available for the host system transmitting read requests and write requests to the memory system, the memory system having a plurality of memory components, and the buffer to buffer data associated with a first type of requests to read data from the memory components and a second type of requests to write data to the memory components, wherein at least a portion of the buffer is configured to be usable to store the different types of requests in different periods of times, the different types of requests including the first type of requests and the second type of requests;

transmitting, by the host system to the memory system via the command bus, a read request to retrieve first data from the memory components;

reducing, by the host system, the amount based on the read request;

transmitting, by the host system to the memory system via the command bus, a write request to store data in the memory components;

reducing, by the host system, the amount based on the write request;

storing, in the host system, an amount of available read buffer capacity of the memory system for transmitting read requests from the host system to the memory system;

reducing, by the host system, the amount of available read buffer capacity based on the read request;

storing, in the host system, an amount of available write buffer capacity of the memory system for transmitting write requests from the host system to the memory system;

reducing, by the host system, the amount of available write buffer capacity based on the write request;

receiving, in the host system from the memory system via the transaction bus, an indication that the first data requested by the read request is available after the memory system executes the read request and the write request;

transmitting, from the host system to the memory system, a command to request the memory system to send the first data; and in response to the command, receiving, in the host system from the memory system via the data bus, the first data requested by the read request;

receiving, in the host system from the memory system via the metadata bus, an indication of an amount of buffer capacity released from completion of at least the write request;

increasing, by the host system, the amount of write buffer capacity according to the amount of buffer capacity released from the completion of at least the write request; and increasing, by the host system, the amount of available read buffer capacity, based on the receiving of the first data requested by the read request.

5. The method of claim 4, further comprising:

receiving, in the host system from the memory system, data identifying the amount of buffer capacity of the memory system that becomes available after completion of one or more write requests; and increasing, by the host system, the of available buffer capacity of the memory system available for transmitting read requests and write requests from the host system to the memory system, according to the data identifying the amount of buffer capacity of the memory system that becomes available after completion of the one or more write requests.

6. A non-transitory computer-readable storage medium storing instructions that, when executed by a processing device, cause the processing device to:
receive, in a host system from a memory system having a buffer and coupled to the host system via a plurality of buses including a command bus, a data bus, a transaction bus, and a metadata bus, an initial indication representative of amounts of buffer space available in the buffer to store data associated with requests of different types;
store, in the host system, an amount of read buffer capacity of the memory system having a plurality of memory components, and the buffer to buffer data associated with a first type of requests to read data from the memory components and a second type of requests to write data to the memory components, wherein at least a portion of the buffer is configured to be usable to store the different types of requests in different periods of times, the different types of requests including the first type of requests and the second type of requests;
transmit, by the host system to the memory system via the command bus, a read request to retrieve first data from the memory components;
reduce, by the host system, the amount of read buffer capacity based on the read request;
store, in the host system, an amount of total buffer capacity of the memory system;
reduce, by the host system, the amount of total buffer capacity based on the read request;
transmit, by the host system to the memory system via the command bus, a write request to store data in the memory components;
reduce, by the host system, the amount of total buffer capacity based on the write request;
store, in the host system, an amount of write buffer capacity of the memory system;
reduce, by the host system, the amount of write buffer capacity based on the read request;
receive, in the host system from the memory system via the transaction bus, an indication that the first data requested by the read request is available after the memory system executes the read request and the write request;
transmit, from the host system to the memory system, a command to request the memory system to send the first data; and
in response to the command,
receive, in the host system from the memory system via the data bus, the first data requested by the read request;
receive, in the host system from the memory system via the metadata bus, an indication of an amount of buffer capacity released from completion of at least the write request;
increase, by the host system, the amount of write buffer capacity according to the amount of buffer capacity released from the completion of at least the write request; and
increase, by the host system, the amount of read buffer capacity, based on receiving of the first data requested by the read request.

7. The non-transitory computer-readable storage medium of claim 6, wherein the instructions that, when executed by the processing device, cause the processing device to:
receive, in the host system from the memory system, data identifying the amount of buffer capacity that becomes available after completion of one or more write requests; and
increase, by the host system, the amount of write buffer capacity based on the data identifying the amount of buffer capacity that becomes available after the completion of the one or more write requests in the memory system.

8. The non-transitory computer-readable storage medium of claim 7, wherein the instructions that, when executed by the processing device, cause the processing device to:
increase, by the host system, the amount of total buffer capacity based on the data identifying the amount of buffer capacity that becomes available after the completion of the one or more write requests.

9. The non-transitory computer-readable storage medium of claim 6, wherein the instructions that, when executed by the processing device, cause the processing device to:
store, in the host system, data identifying a shared portion of buffer capacity of the memory system for buffering read requests and write requests.

10. The non-transitory computer-readable storage medium of claim 9, wherein the instructions that, when executed by the processing device, cause the processing device to:
compute an amount of total buffer capacity available for transmitting read requests and write requests based on the data identifying the shared portion of buffer capacity for buffering read requests and write requests.

11. The non-transitory computer-readable storage medium of claim 9, wherein the instructions that, when executed by the processing device, cause the processing device to:
compute the amount of read buffer capacity available for transmitting read requests based on the data identifying the shared portion of buffer capacity for buffering read requests and write requests.

* * * * *